United States Patent
Lukich

[11] Patent Number: 5,873,275
[45] Date of Patent: Feb. 23, 1999

[54] VEHICLE WHEEL LOCK

[76] Inventor: Walter Vojin Lukich, 13969 Marquesas Way, Ste. #214 B, Marina del Rey, Calif. 90292

[21] Appl. No.: 908,360

[22] Filed: Aug. 7, 1997

[51] Int. Cl.[6] .................................................. B60R 25/00
[52] U.S. Cl. .................................. 70/226; 70/19; 70/209; 188/32
[58] Field of Search ................................. 70/19, 225, 226, 70/237, 259, 260, 209, 18, 14; 188/32

[56] References Cited

U.S. PATENT DOCUMENTS

| | | | |
|---|---|---|---|
| 601,856 | 4/1898 | McDonald | 70/226 |
| 1,156,739 | 10/1915 | Backus | 70/19 |
| 1,346,964 | 7/1920 | Johnson | 70/19 |
| 1,635,228 | 7/1927 | Sokolov | 70/19 |
| 1,812,467 | 6/1931 | Blackmore | 70/19 |
| 1,875,734 | 9/1932 | Hurd | 70/19 |
| 3,868,837 | 3/1975 | Quimby | 70/259 |
| 3,907,072 | 9/1975 | Shafer | 188/32 |
| 4,031,726 | 6/1977 | De Jager | 70/226 |
| 4,164,131 | 8/1979 | Desmond et al. | 70/14 |
| 4,175,410 | 11/1979 | Schwaiger et al. | 70/226 |
| 4,441,586 | 4/1984 | Bernierer | 188/32 |
| 4,649,724 | 3/1987 | Raine | 70/237 |
| 4,723,426 | 2/1988 | Beaudoin | 70/14 |
| 4,738,127 | 4/1988 | Johnson | 70/209 |
| 4,768,359 | 9/1988 | Wade | 70/14 |
| 4,804,070 | 2/1989 | Bohler | 188/32 |
| 4,819,462 | 4/1989 | Apsell | 70/14 |
| 4,833,442 | 5/1989 | Von Heck | 340/427 |
| 4,854,144 | 8/1989 | Davis | 70/226 |
| 4,878,366 | 11/1989 | Cox | 70/14 |
| 5,134,868 | 8/1992 | Bethards | 70/18 |
| 5,137,121 | 8/1992 | Leonard | 188/32 |
| 5,176,013 | 1/1993 | Katauskas | 70/18 |
| 5,247,815 | 9/1993 | Caldwell | 70/19 |
| 5,315,848 | 5/1994 | Beyer | 70/18 |

FOREIGN PATENT DOCUMENTS

| | | | |
|---|---|---|---|
| WO96/17755 | 6/1996 | WIPO | 70/19 |

*Primary Examiner*—Darnell M. Boucher
*Attorney, Agent, or Firm*—Small Larkin, LLP

[57] ABSTRACT

A vehicle wheel lock which is adjustable to accommodate various sized wheels on a vehicle and/or the steering wheel of the vehicle, and includes a two-part base, one-part insertable into the other part, two arms extending in a U-shaped fashion from the base, the distal ends of the U-shaped arms curving inward toward each other, with a serrated locking bracket positioned internal to and attached to one of the insertable bases, and a cylinder-type lock positioned internal to and attached to the opposed base, wherein the width of the lock, that is the distance between the opposed arms, may be adjusted for placement of the lock around tires of various sizes and on to a wheel, and/or a steering wheel, and for placing the lock in a position whereby the lock may be locked, thereby immobilizing the vehicle wheel or steering wheel and preventing theft of the vehicle.

20 Claims, 8 Drawing Sheets

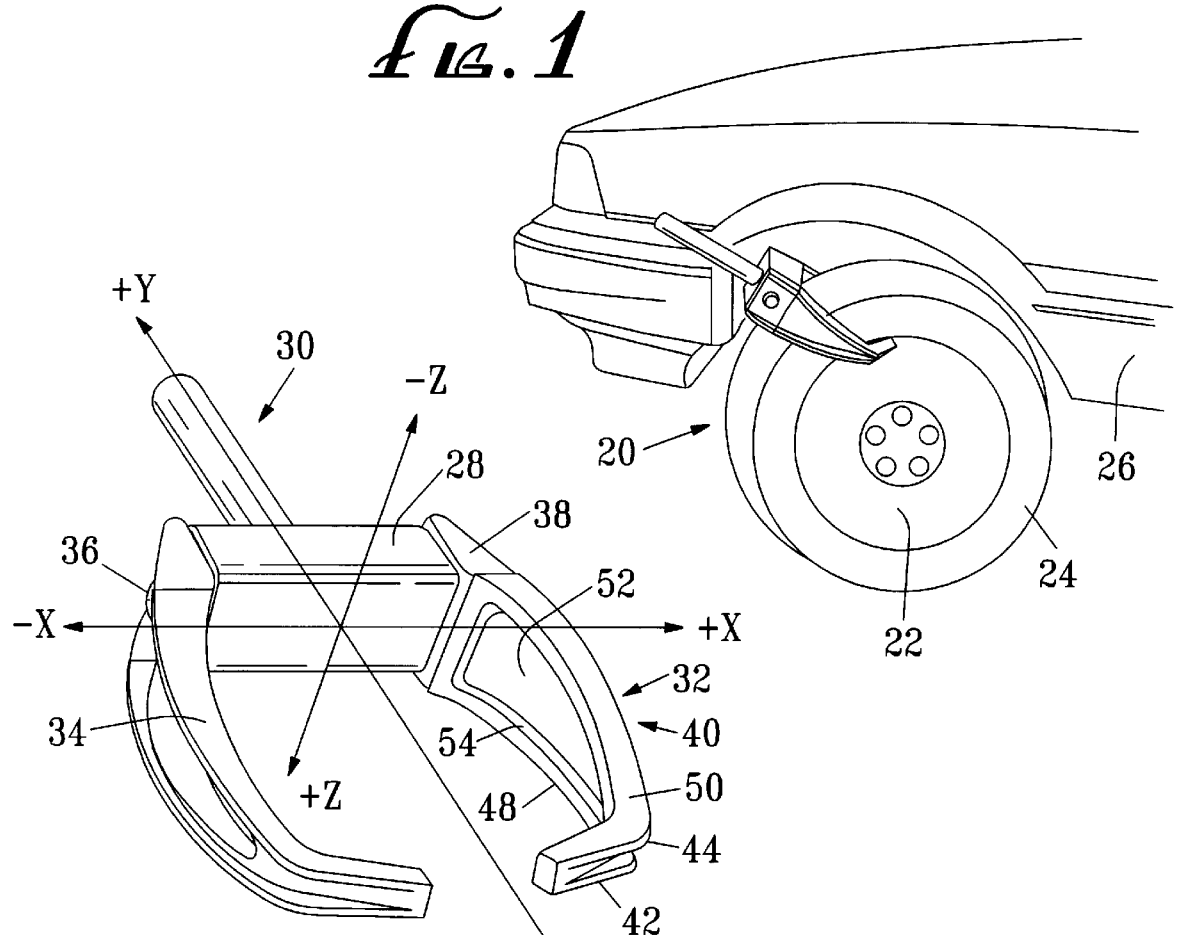

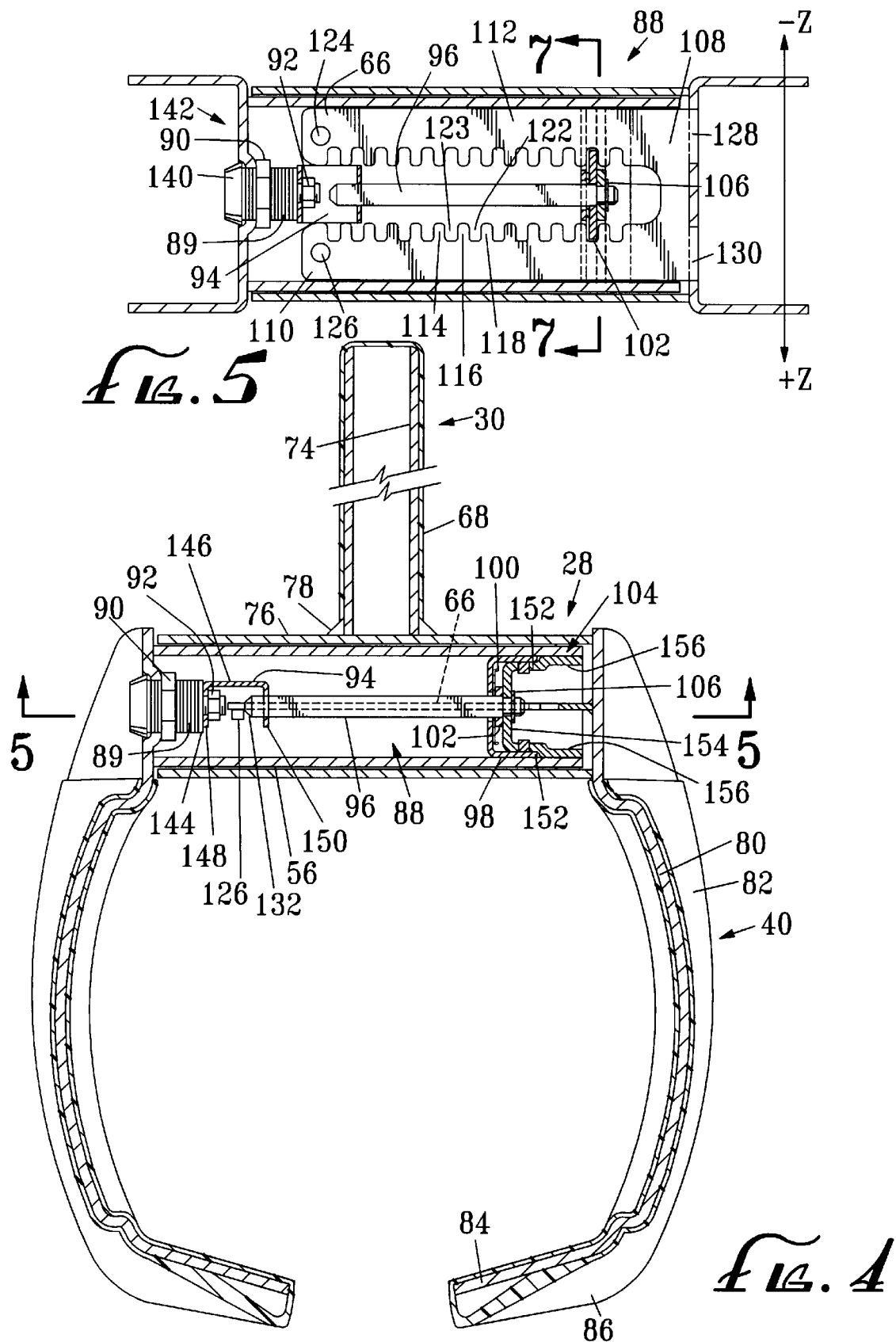

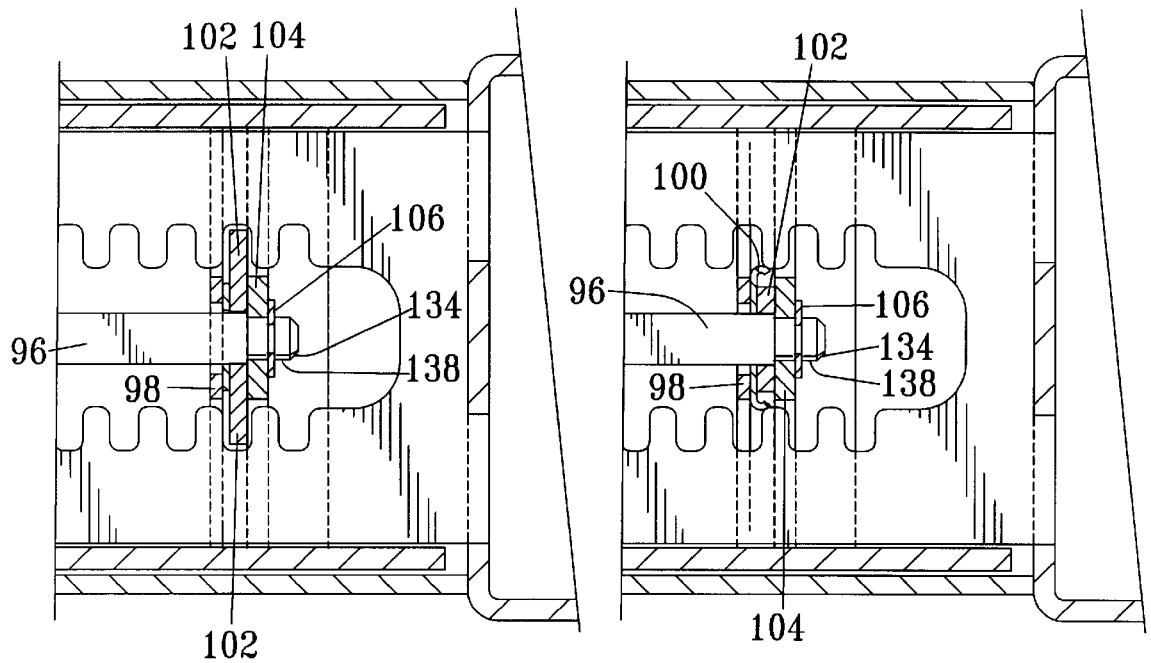
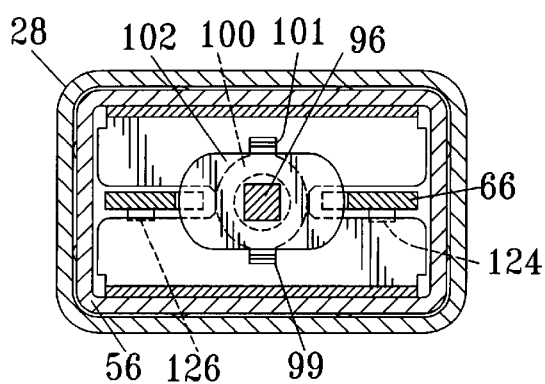
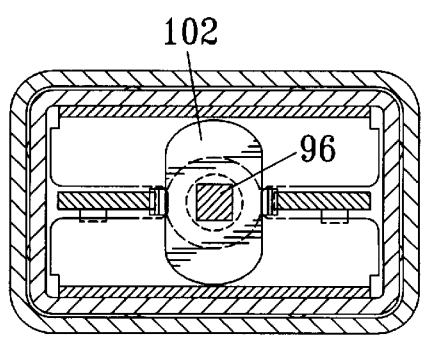

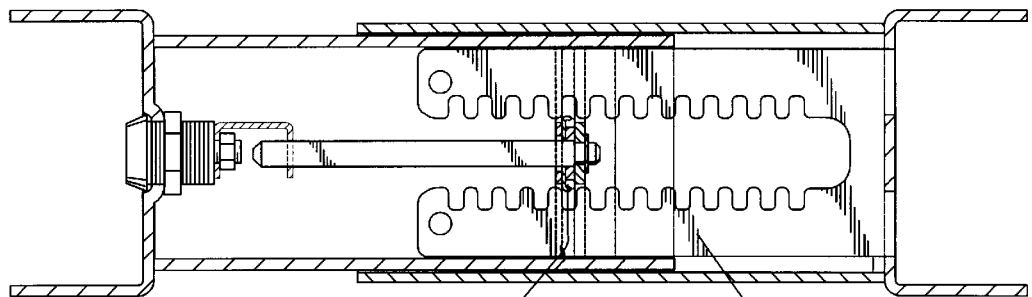
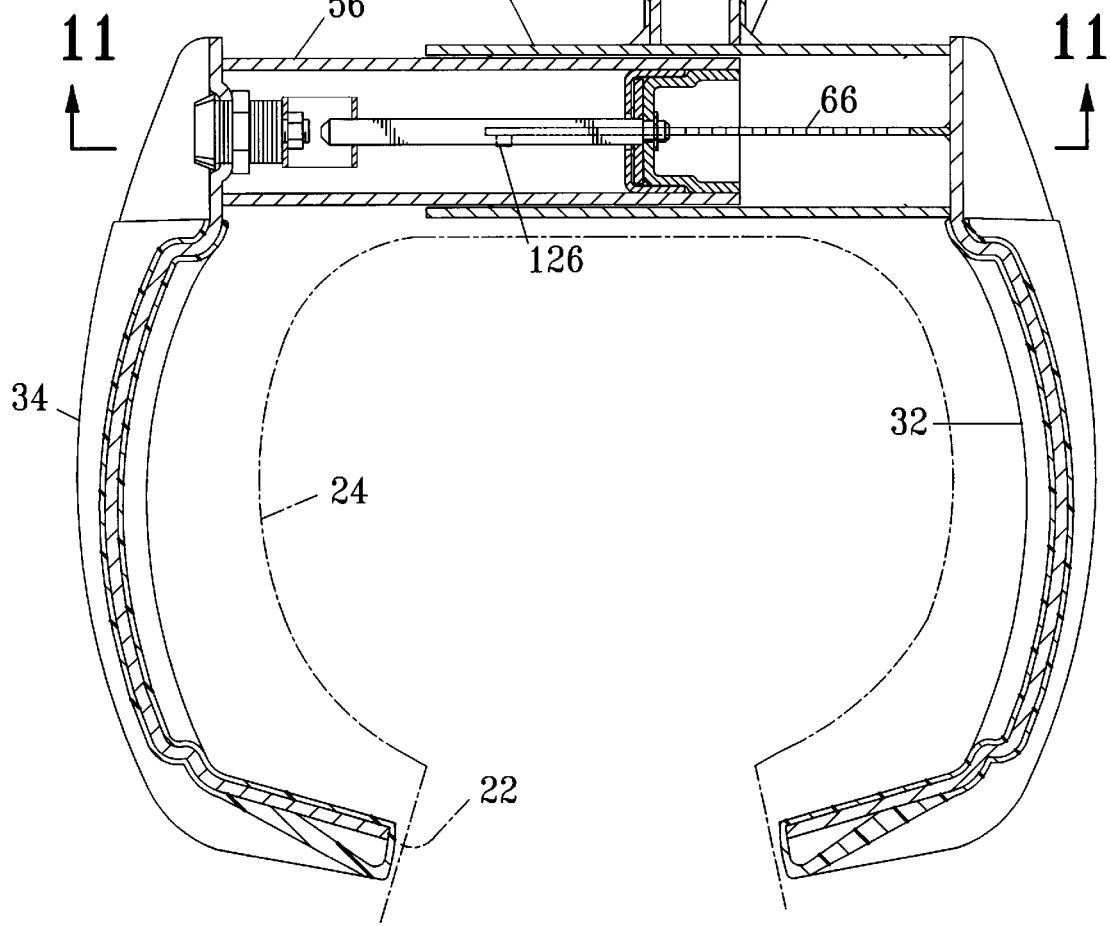

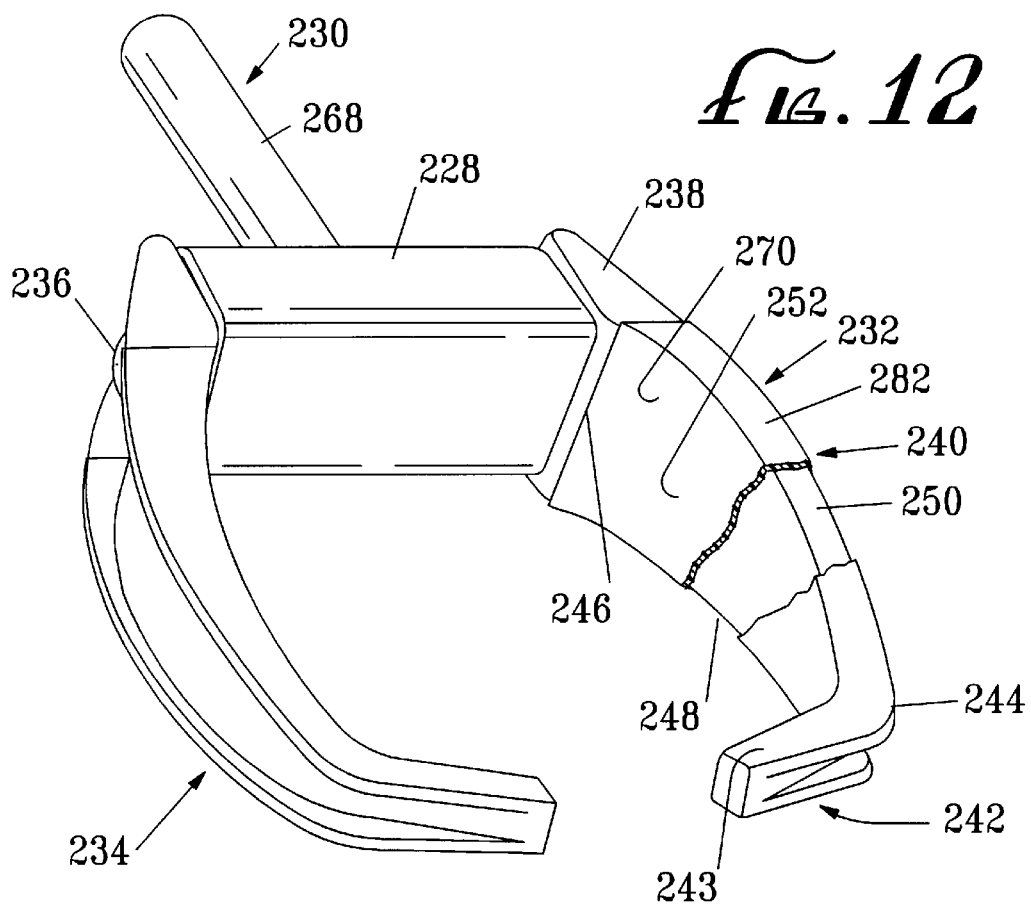
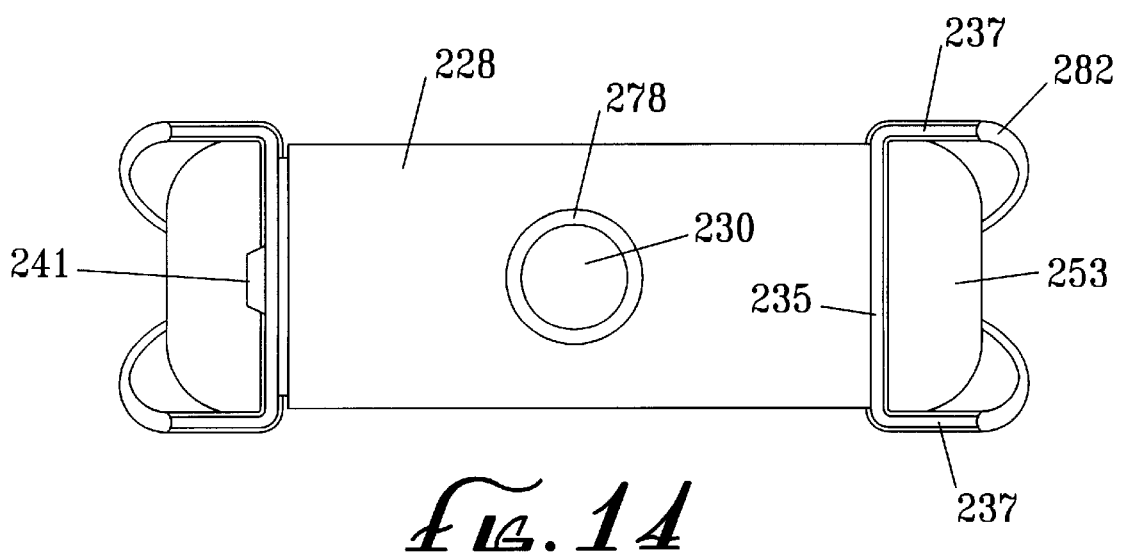

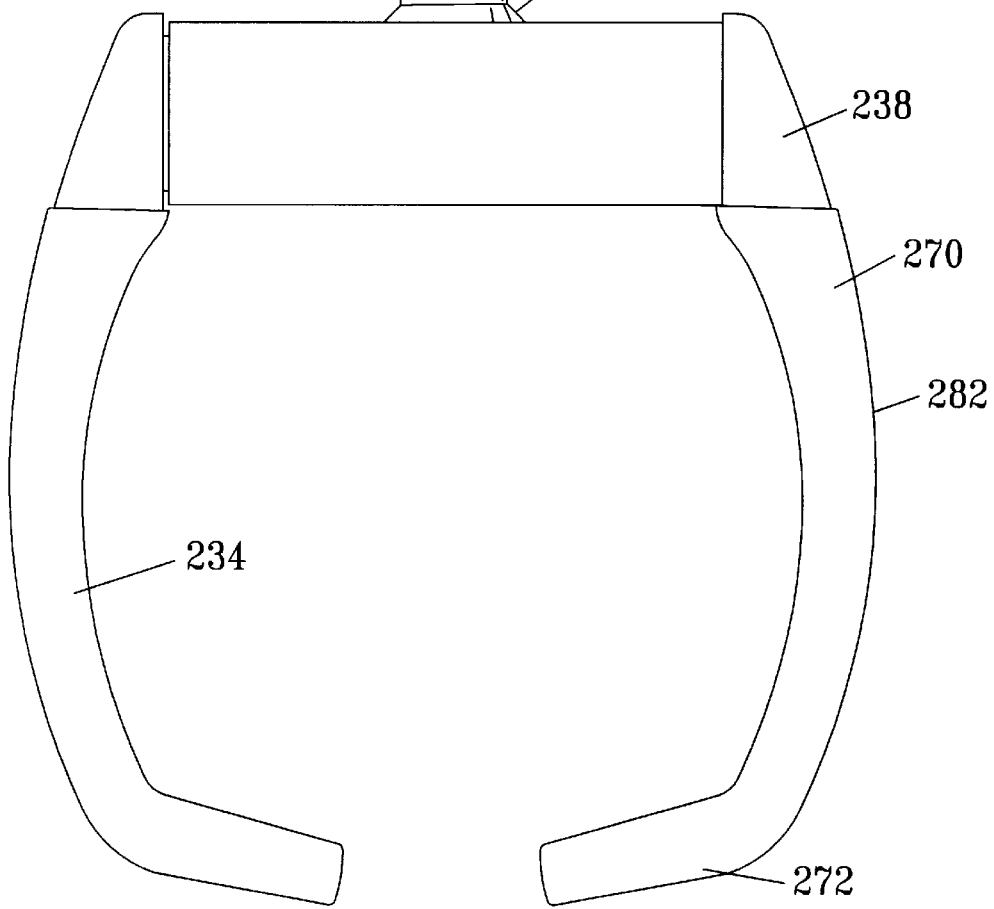

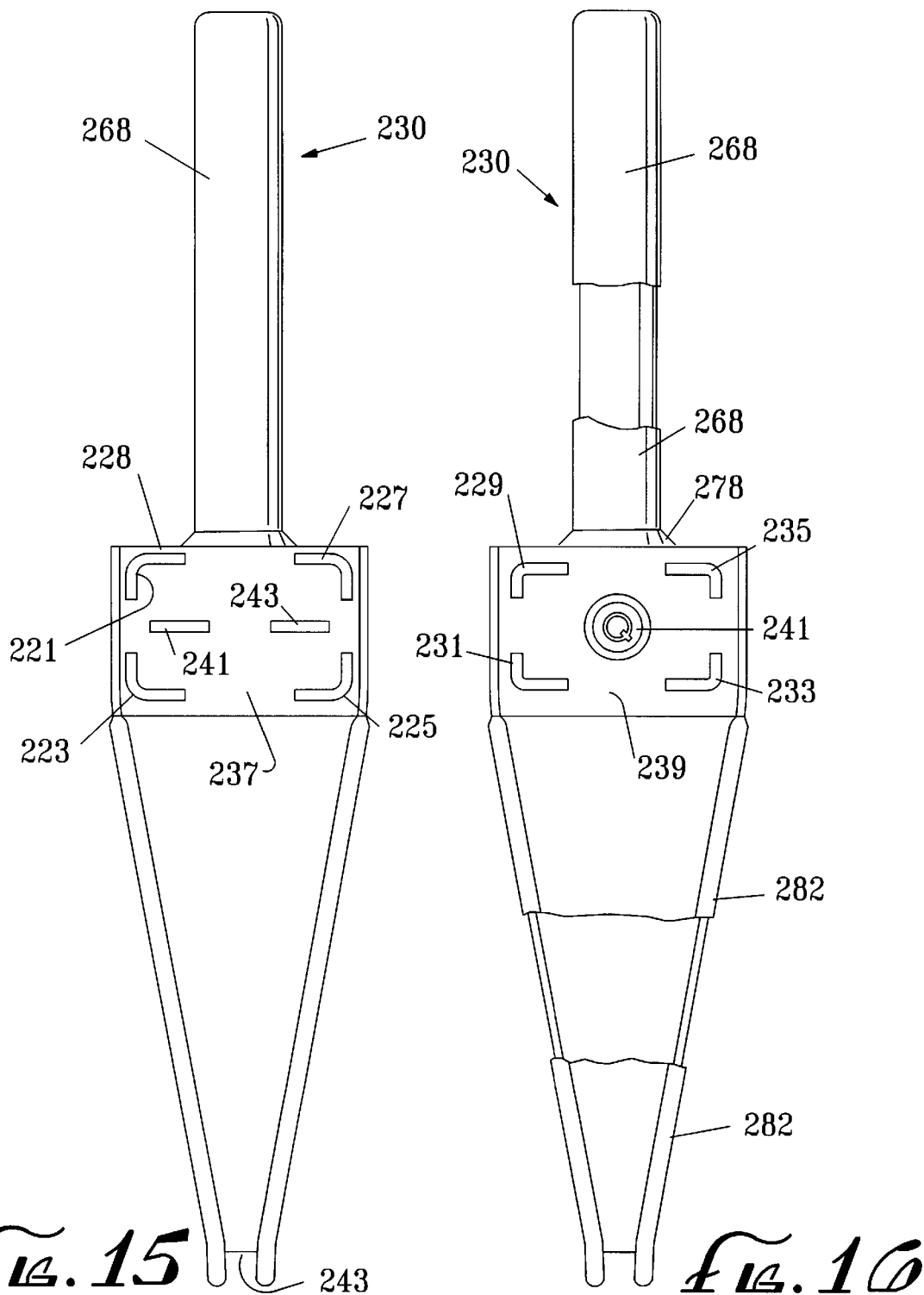

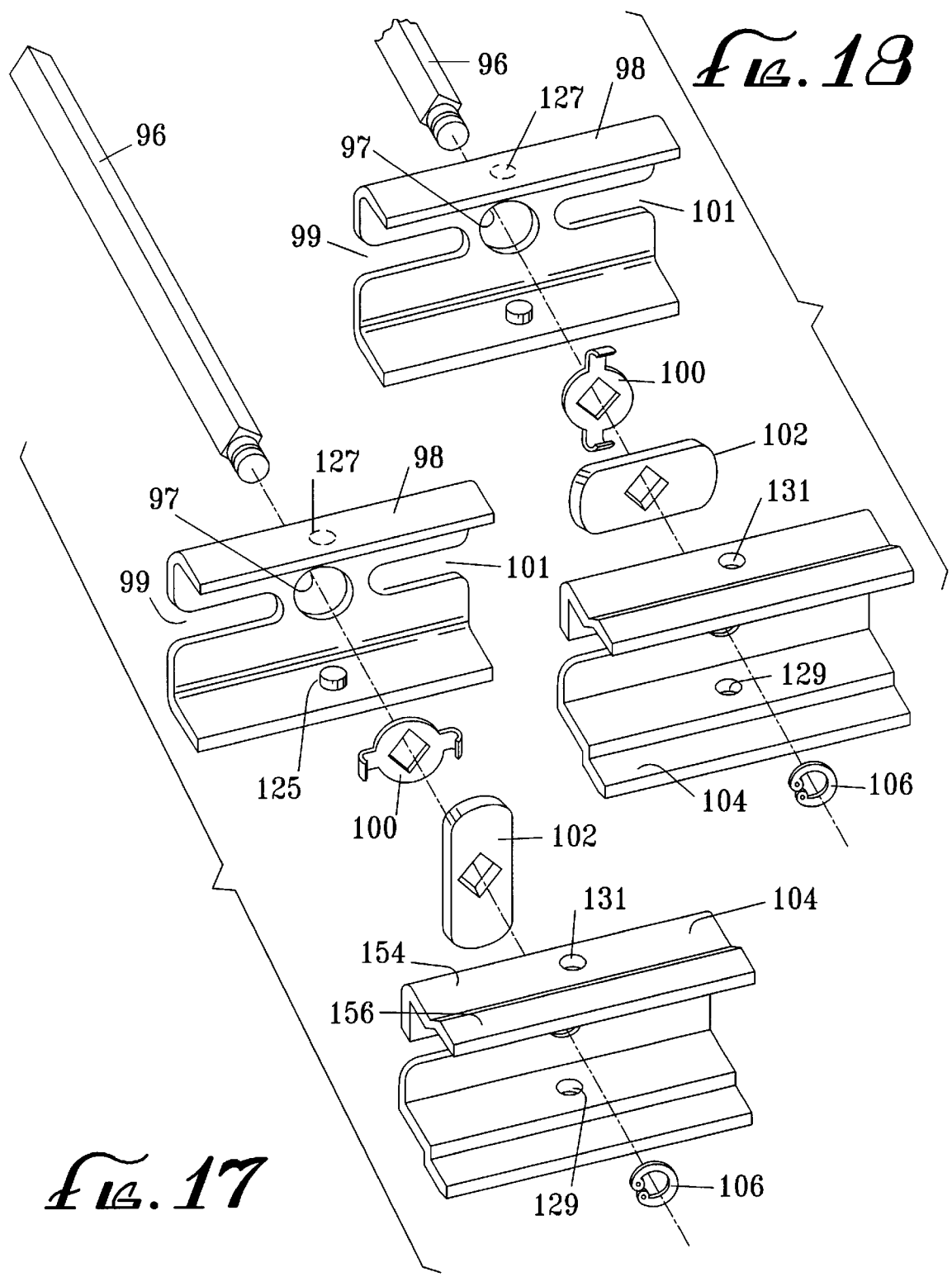

VEHICLE WHEEL LOCK

BACKGROUND OF THE INVENTION

A. Field of the Invention

The present invention is directed to a vehicle wheel and/or steering lock.

B. Description of the Prior Art

Vehicle wheel locks are known. However, they are very large, cumbersome and typically can weigh up to about 25 pounds. They are used by law enforcement authorities to immobilize vehicles, are placed on vehicles by professional traffic enforcement personnel, and, although they secure the vehicle against movement, they are also too cumbersome and heavy to be of practical use to the general public as a means for theft prevention. These known wheel locks, often referred to as the "BOOT", also, typically require up to about ten minutes to install on the wheel of an automobile.

OBJECTS AND SUMMARY OF THE INVENTION

It is an object of the invention to provide a vehicle wheel locking device which attaches directly to the wheel of a vehicle, securely locks itself to the wheel, and thereby immobilizes the vehicle.

It is a further object of the present invention to provide a vehicle wheel locking device which is adjustable to accommodate various sized wheels.

It is a further object of the invention to provide a vehicle wheel locking device which is tamper resistant, strong, portable, simple to use, does not damage the metal surfaces of the vehicle or its wheel and has an attractive and unique shape, style and overall configuration.

With reference to the above-described objects, the present invention provides a vehicle wheel locking device which includes generally a U-shaped body having at its closed or bottom end, an inner and an outer housing, the inner housing being slidable within the outer housing, each of the arms of the locking device extending away from the housing at generally a right angle, to form a U-shape, and each having a distal end angled inward at a relatively sharp angle, to form a claw and thereby provide for locking of the wheel of the vehicle. The outer housing also has a handle attached thereto for ease of installation and removal of the vehicle wheel lock from the vehicle. The handle also functions to provide a physical impediment to rotation of the wheel as the handle hits the ground or the vehicle itself in an attempted movement of the wheel. The handle and the arms are coated with a durable, preferably elastomeric material to prevent metal-to-metal contact of the vehicle wheel lock with the vehicle, and to facilitate handling of the vehicle wheel lock by a person. The inner and outer housings of the device provide for retaining a locking assembly by which a locking cam may be rotated into and out of locking position at one of many serrations in a serrated locking bracket which is affixed to one side or arm of the device, and the cylinder and key affixed to the opposite wall, to thereby provide for adjusting the distance between the arms. In this fashion, the arms, in an unlocked position, can be adjusted so that the claw or distal ends of the arms are wide enough apart to fit over the tire of the vehicle wheel, and, upon insertion of the inner housing into the outer housing, reducing the distance between the arms, thereby moving the distal ends of the two arms close enough together to be less than the width of the rim and tire, thereby placing the device in a position to be locked upon operation of a key whereby the cam lock is rotated into position between serrations in an internal locking bracket, the key removed, and the lock being locked in the closed position so that the vehicle wheel lock cannot be removed from the vehicle wheel. Installation of the locking device of the present invention is relatively fast, taking only seconds to install.

Additionally, an optional locking adapter bracket is provided for when the locking device is used to lock a steering column wheel. The bracket is U-shaped, and has holes in each opposed leg, which holes are sized to accommodate the distal ends, i.e., the claws of the locking device arms, thereby providing a closed loop-type lock.

BRIEF DESCRIPTION OF THE DRAWINGS

FIG. 1 is a side perspective view of a first embodiment of the vehicle wheel lock of the present invention, shown installed on an automobile wheel.

FIG. 2 is a perspective view of the FIG. 1 embodiment, showing both arms of the device.

FIG. 3 is an exploded perspective view of the FIG. 1 embodiment, from the perspective of FIG. 2, and includes an optional locking adapter bracket.

FIG. 4 is a partial, side cross-sectional view of the FIG. 1 embodiment.

FIG. 5 is a top cross-sectional view of the locking mechanism of the FIG. 1 embodiment, taken through line 5—5 of FIG. 4.

FIG. 6 is an enlarged, partial, top cross-sectional view of the right side of FIG. 5, shown in a locked position.

FIG. 7 is an end, cross-sectional view of the FIG. 1 embodiment, taken along line 7—7 of FIG. 5, showing the lock assembly in a locked position.

FIG. 8 is an enlarged, partial, top cross-sectional view of the right hand side of FIG. 5, showing the lock in an unlocked position.

FIG. 9 is an end, cross-sectional view of the lock assembly taken along line 7—7 of FIG. 5, but showing the lock in an unlocked position.

FIG. 10 is a side cross-sectional view of the FIG. 1 embodiment, shown in an expanded position to accommodate a relatively large wheel.

FIG. 11 is a top cross-sectional view taken through line 11—11 of FIG. 10.

FIG. 12 is a front, perspective view of an alternate embodiment of the present invention.

FIG. 13 is a side view of the FIG. 12 embodiment.

FIG. 14 is a bottom view of the FIG. 12, embodiment.

FIG. 15 is a side view of the FIG. 12 embodiment, illustrating the side to which the locking assembly bracket is attached.

FIG. 16 is a side view of the FIG. 12 embodiment, illustrating the side to which the locking assembly cylinder is attached.

FIG. 17 is an exploded, perspective view of the FIG. 1 embodiment locking cam, keeper and related components shown in an unlocked position.

FIG. 18 is an exploded, perspective view of the FIG. 1 embodiment locking cam, keeper and related components shown in a locked position.

FIG. 19 is a perspective view of the FIG. 1 embodiment shown positioned on the steering column of an automobile.

DESCRIPTION OF THE PREFERRED EMBODIMENTS

Referring to FIGS. 1–11, a first preferred embodiment of the present invention will be described. As shown in FIG. 1, the vehicle wheel lock 20 of the present invention is shown installed over the wheel 22 and tire 24 of an automobile 26. As may be appreciated, the wheel lock of the present invention may be affixed at a different radial position on the wheel and tire than that shown. Also, it is intended that the vehicle wheel lock of the present invention may be used for not only automobiles but trucks, boat trailers, recreational vehicles, small airplanes, all terrain vehicles, motorcycles, and virtually any other vehicle that has at least one wheel. In one preferred use, the wheel lock of the present invention functions to prevent theft or movement of the vehicle by securely locking itself to the wheel of the vehicle. Because it is exterior to the wheel, and securely fastened to the wheel, it physically prevents rotation of the wheel. In an alternate preferred use, the wheel lock of the present invention may be positioned around the steering column of the vehicle, to physically prevent rotation of the steering wheel.

Referring to FIG. 2, the wheel lock 20 of the present invention includes an external housing 28, a handle 30, a first arm 32, and a second arm 34. For ease in describing the spatial relationship of components, each to the other, an x-y-z grid has been included in FIG. 2. The vertical dimension is represented on the Y axis, with the handle shown extending from the center of the device in the +Y direction and the distal ends of the arms in the -Y direction. The housings slide with respect to each other in the X dimension, with the direction from the center of the device to the left of the page in FIG. 2 being assigned the -X direction, and the direction from the center to the right being the +X direction. The Z axis is used to represent width, such as the width of the housing, with the -Z direction assigned as being from the center of the device toward the top of the page in FIG. 5 and the +Z direction from the center of the device toward the bottom of the page.

Also shown in FIG. 2 is key 36 for a locking assembly which will be shown and described in detail below. The outer housing 28 encloses an inner housing which will be shown and described in detail below. The first arm 32 and second arm 34 are in a mirror image relationship to each other, and have several corresponding features which will be described with reference to first arm 32 only. The arm 32 includes a base section 38 and a middle section 40, which extend generally along the Y dimension. At the distal end of the arm 32 a claw section 42 extends in the X dimension inwardly toward the center preferably at a relatively sharp angle, beginning at curve 44. Each arm is, preferably, of a unitary construction, and preferably, made of hard steel or the equivalent. A base 38 is sized and configured to provide for secure attachment to the outer housing 28 and to provide a secure foundation for the middle section 40 of the arm 32. The middle section 40 of the arm 32 provides a gentle, concave inward curve (X dimension) along its length (Y dimension) from the base 38 to the sharp curve 44 where it becomes the claw 42. The middle portion 40 is generally triangular in shape whereby at its lower edge in the Z dimension is of a width at least equal to the width (Z dimension) of the outer housing 28. Progressively along the length of the leg portion 40, toward the curve 44, the width (Z dimension) of the triangle decreases to become relatively narrow at the curve 44 to form an apex. The three legs of the triangle include base 46, which extends along the Z dimension, as well as leg 48 and leg 50 which extend generally along the Y dimension. Referring to FIGS. 2 and 3, the center region 52 of the triangle is formed into a stiffening ridge or embossment, which is indented to increase the strength of the arm. This indentation extends in the X dimension and forms a shallow cavity, which is open toward the center of the device. The depth of the embossment is shown as depth 54. This embossment is also referred to as a strengthening ridge 52.

Referring to FIG. 3, inner housing 56 is shown as insertable into the outer housing 28 along the X dimension. Preferably, each of the four sides of the internal housing 56 have raised, longitudinal ridges which facilitate sliding of the inner housing 56 into the outer housing 28. Four ridges, 58, 60, 62 and 64 are shown and four corresponding ridges on the opposite sides of the housing 56 are not shown.

Also shown in FIG. 3 is an optional adapter bracket 51. The bracket 51 is generally, and preferably U-shaped, with holes or orifices 53, 55 at each end 59, 61. Each hole 53, 55 is sized and configured to accommodate the distal end of the claw 44 of each by 32, 34. The bracket 51 is oriented with its base 57 closer to the locking mechanism. Alternatively, the bracket 51 may be oriented 180 degrees so that its base 57 is away from the center of the device.

The inner housing 56 is preferably made of 0.12-inch thick hard steel, although it may be made of other materials so long as it provides good strength and durability. The raised portions 58, 60, 62 and 64 are embossments with a height of, preferably, 0.01 to 0.015 inches and a width of approximately 0.02 inches. They may extend along a significant portion of the outer sides of the tube 56 and are, preferably, of a length of approximately 4.375 inches, with the entire length of the housing being approximately 5.875 inches. At one end of the housing, in the base portion of the arm 34, four weld extensions or tabs are provided for insertion through corresponding slots in the base portion of arm 34 and for secure weldment of the inner housing 56 to the base of the arm 34. These features are shown in FIGS. 15 and 16 in connection with an alternate embodiment.

The outer housing 28 is also made of correspondingly hard material, and typically has a length of approximately 5.8775 inches. At one end a slot of approximately 1.5 inches in length and 0.140 inches in depth is cut from the center of the top and bottom edges to provide for weld extensions or tabs, as described previously with respect to the inner housing 56. These weld extensions are inserted through corresponding holes in the base 38 of leg 32 to facilitate welding of the outer housing 28 to the base 38 of the arm. The bottom wall of the outer housing 28 has a circular bore with a diameter of approximately 0.50 inches provided for insertion of the handle 30 and to facilitate welding the handle 30 to the external housing 28. Alternatively, the handle may simply be welded to the housing, or attached by other conventional techniques. The corners of the housing around it has a radius of approximately 0.160 inches. The internal length and width dimensions of the outer housing are approximately 2.7 inches by 1.76 inches, to provide for accommodating the inner housing 56. Also shown in FIG. 3 is the open end of the locking bracket 66, as will be described and shown in greater detail below.

The handle 30, the middle portion 40 and the claw 42 of the arm 32 are coated with a relatively thick, durable, elastomeric material as shown at 68, 70 and 72 in FIG. 3. With respect to the handle 68, the coating provides a surface which is easier, and more comfortable to grip with the hand than a bare metal surface, and minimizes damage done to the vehicle in the event that the handle contacts part of the vehicle. The coating 70 and 72 on the middle and claw portions of each of the arms also protect against scratching from abrasion and/or other metal-to-metal contact between the metal structure of the arms and the metal of the vehicle wheel or steering column, such as shown at 22 in FIG. 1 and in FIG. 19, respectively. It is emphasized that although these details are specifically described with respect to the first arm 32, as shown in FIGS. 2 and 3, the coatings also are applied to the second arm 34.

Referring to FIG. 4, the rubberized coatings to the handle and arms, as well as the uncoated locking assembly are shown. Rubberized coating 68 is shown overlying the internal, metal structure 74 of the handle 30. The metal supporting structure 74 of the handle 30 is, preferably, hard steel stock pipe of, preferably, 1-inch diameter, and which is welded to the bottom surface 76 of the outer housing 28 at weldment 78. Referring to first arm 32, the underlying steel supporting structure, corresponding to the strengthening rib 52 of FIG. 2, is shown with reference numeral 80. The surrounding rubberized coating for the arm portion is shown at 82. Similarly, the underlying steel portion of the claw 42 is shown at 84 and with its rubberized coating 86.

Referring to FIGS. 4 and 5, a locking assembly 88 is shown inside of the inner housing 56. The locking assembly includes cylinder 89, lock nut 90, nut 92, cylinder extension 94, shaft 96, keeper 98, spring 100, cam lock 102, end cap 104, snap ring 106 and the locking bracket 66. The locking bracket 66 is generally U-shaped and is securely fastened to the outer housing 28 and the base portion of first arm 32, such as, preferably, by welding. The bracket 66 has its closed end 108, its opened end 110 and an intermediate portion 112. On the internal, opposed edges of the bracket 66 are a plurality of serrations which include a plurality of peaks, as illustrated with reference numerals 114, 116 and 118 with corresponding valleys 122 and 123 in between the peaks 114 and 116, and 116 and 118, respectively. The number of serrations is optional, with a greater number of serration per inch providing the capability of a tighter fit, or tighter lock. The bracket 66 is also made of a hard, durable material, preferably hard steel. It is typically ⅛-inch thick, a thickness sufficient to provide strength, and is of a length determined by the maximum size of the wheel for which a particular lock is designed to accommodate. Positioned at the open end 110 of the bracket, on opposite legs of the U are retaining posts 124 and 126. These posts are preferably 0.25 inches in diameter. Preferably, the length of the bracket is approximately 5.3 inches, with a thickness of 0.125 inches, and a width of about 2.375 inches. The preferred width of each tooth is approximately 0.140 inches, and the distance between the bottom point of adjacent valleys is 0.31 inches. The preferred height of each peak, or tooth is 0.25 inches, and each valley has a 0.0625 radius. The preferred height of the posts 124 and 126 is 0.075 inches and the preferred distance between the center of each post 124 and 126, is 0.1829 inches. The function of the posts 124, 126 is to retain the inner housing within the outer housing during normal use, i.e., to keep the inner and outer housings from coming apart too easily. The width of the U, i.e., the distance between the top portions of corresponding peaks, or teeth on opposing legs of the U is 0.8125 inches. Each tooth has a top surface which is rounded at, preferably, a radius of curvature of 0.0625 inches. The closed end 108 of the locking bracket has weld extensions 128 and 130 for insertion into corresponding access or weld holes on the base 38 of the arm 40, to facilitate welding of the locking bracket 66 to the base and outer housing 28.

Referring to FIGS. 4–8, the shaft 96 is preferably ⁵⁄₁₆-inch square stock, having a rounded first end 132 with a 45 degree chamfer, and a second rounded end 134 also with a 45 degree champer. At the second end of the shaft 96, a relatively short section, preferably approximately 0.295 inches, has been rounded off, to a diameter of approximately 0.276 inches. This rounded off section is shown at 136 in FIGS. 6 and 8. Intermediate the rounded off section 138 and the square section of the shaft, a channel is machined into the shaft 96, to accommodate snap ring 106. The channel is not illustrated, however, it is preferably of approximately 0.039 inches in width, and is cut to a depth wherein the diameter of the shaft at the channel is approximately 0.21 inches.

Referring to FIGS. 4 and 5, the locking assembly 88 includes the lock cylinder 89 which is a conventional tubular lock, selected, preferably, for strength, durability, and difficulty in being picked and/or having its keys duplicated. In the preferred embodiment, a ⅝-inch cam lock cylinder lock, with two keys, manufactured by Baton Company as its Model No. 7085DB10 is used. Cylinder 89 extends in the X dimension as shown at 140, along the longitudinal centerline of the inner housing 56 through bore 142 in the bottom part of the arm 34.

The first or external end 140 of the cylinder is positioned within a bore 142 in the base portion of leg 34 and is held in place with locking nut 90. At the opposite end 144 of the cylinder 89, cylinder extension 94 is fastened to the cylinder with nut 92. The cylinder extension 94 is a U or channel-shaped member, preferably made of hard steel or equivalent material. Its dimensions are such as to provide a sturdy and dependable structural member to cooperate with shaft 96, and, together to extend the operative length of the lock cylinder 89 throughout the length of the locking bracket 66 for the locking assembly 88. Preferably, the length of the base, or bottom portion 146 of the cylinder extension 94 is approximately 0.84 inches. A bore is cut in the first end 148 of the extension 94. The bore is of a size and shape to correspond to and fit over the shaft of the cylinder 88. The opposite end 150 of the u-shaped cylinder extension 94 also has a bore cut through it, with the bore shaped to accommodate the shaft 96, which in the case of the preferred embodiment is a generally square bore having sides of approximately 0.3140 inches, and rounded corners, with each rounded corner having a radius of approximately 0.02 inches.

Referring to FIGS. 4–9 and 17–18, the keeper 98, spring 100, cam lock 102, end cap 104 and snap ring 106 will be described. In this regard, FIGS. 6, 7 and 18 show the lock assembly in a locked position, and correspond to the right hand portion of FIGS. 4 and 5. FIGS. 8, 9 and 17 correspond to FIGS. 6 and 7; however, they show the locking assembly in an unlocked position.

Keeper 98 is generally of a U-shaped configuration, as illustrated best in FIGS. 4 and 17–18. The keeper 98 is made preferably of hard steel or the equivalent, and is sized to provide a sturdy, tamper-resistant structural member. The keeper 98 has preferably a length (Z dimension) of approximately 2.274 inches, a channel width (Y dimension) of approximately 1.3069 inches and is of a thickness of approximately 0.075 inches. The height (X dimension) of the keeper is approximately ½ to 0.650 inches. The center of the bottom portion of the U has a circular bore 97 to accommodate the rounded end of the shaft 96, and is of, preferably, a diameter of about 0.425 inches. The center or bottom part of the U-shaped keeper 98 also has longitudinal slots 99,101 extending along its center, on either side of a bore, to accommodate the side legs of the U-shaped locking bracket 66. The length and height of the two channels will, of course, be sufficient to provide clearance for the opposing legs of the U-shaped locking bracket 66, but only when the outer housing is tilted with respect to inner housing. Otherwise, posts 124, 126 will abut the keeper, to prevent the inner and outer housing of the locking device to come apart without an affirmative tilting action by the user. The slots 99,101, preferably are approximately 0.25 inches in thickness and approximately 0.773 inches in length. Shown in FIGS. 17–18, each of the legs of the U-shaped keeper 98 has two raised posts, one of which, 125, is shown, and the other of which, 127 is shown in broken lines. The posts 125, 127 have centerlines approximately 0.165 inches from the opened end of each leg and extending toward the inside channel of the keeper. These posts function to fit into corresponding bores 129, 131 of the end cap 104, and lock these two pieces together.

Placed adjacent to the U-shaped keeper 98 is spring 100, shown best FIGS. 17–18. The spring has a generally circular center section, with a square bore having sides of approximately 0.1314 inches to accommodate the shaft 96. The spring 100 assists to keep the inner and outer housing from falling apart or separating or disengaging too easily. The spring 100 also functions to assist the user in positioning the cam lock in proper position for locking, by generating a clicking sound as the spring hits each peak of the serrated locking bracket during relative movement of the inner housing within the outer housing. Immediately after a "click", the cam lock is in position to be rotated into a locked position. The round central section of the spring 100 has, preferably, a diameter of approximately 0.7 inches. At either end the body of the spring extends outwardly from the rounded edges to form a rectangular shape having a length of approximately 1.087 inches and a width of approximately 0.35 inches. The 0.35-inch width outer ends of the spring are curved inward, as shown in FIGS. 8 and 17–18, with a radius of curvature of approximately 0.0290 inches and with an outer diameter of approximately 0.1159 inches. The spring is preferably approximately 0.015 inches thick and is of a stainless steel material, or the equivalent.

Cam lock 102 is shown in a locked position in FIGS. 7 and 18, and in an unlocked position in FIGS. 9 and 17. The cam lock is a member having a generally rectangular shape with rounded ends. The rounded ends are rotated into a serration in the locking bracket to cause locking. The ends are rounded off as shown in FIGS. 7, 9 and 17–18. The cam lock is also of a durable, steel construction, preferably, of a hard steel material and having sufficient strength and dimensions to provide for a secure structural member. Preferably the thickness of the cam lock is approximately 0.120 inches, the length of the horizontal portion of the lock is approximately 0.650 inches and the width of the cam lock is approximately 0.60 inches. The rounded ends of the lock have twin tapered edges, each with a radius of curvature of approximately 0.30 inches. A center bore, preferably of square configuration is positioned in the middle of the cam lock, for accommodating the shaft 96.

End cap 104 is a generally U-shaped structural member as shown in FIGS. 4–9 and 17–18. U-shaped end cap 104, however, has a stepped configuration wherein the opposed legs 152 extending outwardly from the base 154, i.e., in a rightward direction as shown in FIG. 4, transition to an outer, wider portion having opposed legs 156 of the U channel end cap to provide a U having 2 different internal widths and, two different external widths. As is best shown in FIGS. 4 and 17–18, the narrower legs 154 provide at their exterior a gap between their outer surface and the inner surface of the internal housing 56 into which the legs of the keeper 98 will fit snugly and the wider legs 156 of the end cap 104 fit tightly against the inner wall of the inner housing 56 so as to provide an extra measure of protection against tampering with the internal locking mechanism. The end cap 104 has a central bore of approximately 0.30 inches diameter to accommodate the rounded portion of shaft 96. The bottom portion of the U of the end cap 104 has two channels sized and positioned to provide for clearance for the locking bracket and the posts 124, 126 of the locking bracket 66 in a functional relationship as described above with respect to the keeper. The channels in the end cap are of approximately the same dimensions as are the channels in the keeper and may, of course, vary, so long as they provide clearance for the serrated legs of the locking bracket 66 (and the posts 124, 126, during tilting), but nevertheless, are not so large as to adversely affect the structural integrity of the locking mechanism.

The length of the end cap is approximately 2.4 inches, the width of the U channel at lower legs 152 is approximately 1.130 inches, and the inner diameter of the U-shaped channel at the extended, wider portions of the legs at 156 is approximately 1.208 inches. The end cap is also made of, preferably, hard steel of approximately 0.12-inch thickness.

Holding the assembly of keeper, spring, cam lock and end cap on the end of the shaft 196 is snap ring 106. The preferred length of the lock assembly is approximately 6.0 inches. The length of the lock assembly, of course, can be varied to accommodate the size of the vehicle wheel to which a particular embodiment of the present invention may be made.

Referring to FIGS. 2, 3 and 4, the arms 32 and 34 are further described, with particular reference to only one arm 32, realizing that its opposite arm 34 is in a mirror image relationship, with only minor differences which are shown and described, e.g., the bore for lock cylinder. The radius of curvature of the central part of the arm itself is approximately 14.0 inches, with the radius of curvature at curve 44 being approximately 1.120 inches. The radius of curvature of 14.0 inches is in the region of the arm which extends from the base portion 38 up to approximately mid-length of the arm, whereupon the radius of curvature changes to 9.0 inches for the outwardmost edge of the arm. At its mid-length the arm 32 has a radius of curvature of 7.0 inches, shown at 35, and the rounded edge of the base portion 38 has a radius of curvature of approximately 3.75 inches, shown at 37 in FIG. 3.

Referring to FIGS. 10 and 11, the vehicle wheel lock is shown in an expanded position to accommodate a relatively large wheel.

Referring to FIG. 10, the outline of the tire 24 and the wheel 22 is shown in dashed lines. The first arm 32 and second arm 34 are shown in an expanded position, i.e., the distance between them in the X dimension is greater than is shown in FIG. 2. Also, as shown in both FIGS. 10 and 11, the inner housing 56 has been inserted only part way into outer housing 28, to provide a greater width lock. Also, as is apparent from FIG. 11, the locking assembly 88 is operative at serrations in the locking bracket 66 which are closer to the open end of the bracket. In FIG. 11, for example, the cam lock 102 is shown positioned in the fifth valley from the open end of the bracket 66, whereas, in FIG. 6, the cam lock 102 is shown in a locked position, and in the second valley from the closed end of the bracket 66. As is also apparent from both FIGS. 10 and 11, the walls of the inner housing and outer housing completely surround the locking assembly 88, to thereby maintain its integrity against tampering.

As may be seen from the above, an adjustable vehicle wheel lock is disclosed whereby it may be adjusted to fit most sizes of automobile wheels, up to about 11½ inch wide tires, and installed in relative short time, typically less than 10 seconds. The wheel lock of the present invention has a weight of approximately eight (8) pounds, and when installed, immobilizes the vehicle wheel by preventing it from rotating and/or turning.

In addition to using the vehicle wheel lock exclusively on tires this device has been designed and engineered to also fit on any steering wheel inside the vehicle. As shown in FIG. 19, this device is preferably positioned, then locked around the steering wheel in such a way that the protrusion of the handle makes it impossible to turn the steering wheel, due to hitting against the side door, windshield, drivers' knees and other parts of the vehicle.

Alternatively, and optimally, the adapter bracket may be used with the present invention. The adapter bracket 51 is shown and described with reference to FIG. 3. It is emphasized, however, that the present invention, without the adapter, will work as a steering wheel lock for most automobiles.

Referring to FIGS. 12–16, an alternate embodiment of the present invention is illustrated. The alternate embodiment is essentially identical to the first embodiment except that the arms do not have the recessed portion or cavity 52, as shown in FIGS. 2 and 3.

The second embodiment and its components will be referred to with reference numerals beginning with 200; however, it will be realized that the components, material of construction and the function of the components for the second embodiment will be identical or essentially identical to corresponding components with respect to the FIG. 1 embodiment. FIGS. 12–16 show not only the second embodiment, not having a strengthening embossment 52, but also provide different views by which to facilitate description of features of the components of the vehicle wheel lock of the present invention.

Referring to FIGS. 12 and 14, the alternate embodiment wheel lock 220 includes external housing 228, a handle 230, a key 236, a first arm 232, and a second arm 234. The first arm 232, and second arm 234 are in mirror image relationship to each other. Referring to the first arm 232, the bottom or base section 238, middle section 240 and the top or claw section 242 is shown. The claw section 242 extends inwardly from part 240 at a relatively sharp angle, beginning at curve 244. The middle portion 240 of the arm 232, is generally of triangular form and the triangle having a base and two legs extending from the base to an apex, defined by base 246, together with leg 248, and leg 250. The center of the triangle is shown at region 252, which in this embodiment, is a smooth surface facing toward (in the X dimension) the opposed arm 234.

FIG. 14 shows the weldment 278 and handle 230 extending from the bottom of the outer housing to 228. The smooth surface of the middle part of the arm 232, opposite surface 252, is shown at 253 in FIG. 14. At the left side of FIG. 14, the external portion 214 of the cylinder is shown.

Also, as shown in FIGS. 12 and 14, the arms 232 and 234 are of a complex, channel form wherein at the base the channel is shown at 235 (Z dimension) and each of the two legs 237, 239 are shown near base 235. Progressing toward the claw end 242 of the arms in the Y dimension, the width of the bottom of the channel becomes progressively narrower, to form a generally triangular shape, as described above, and, the height (X dimension) of the sidewalls is gradually reduced, so that the height of the sidewall shown at, for example, the end 243 of FIG. 12, is substantially less than the height of the sidewall in the lower reaches of the arm as shown for example at 245.

Referring to FIGS. 12–14, the elastomeric coating over the handle is shown in 268, and over the arm 282 is shown at region 270 and region 272. As shown, the coating at 270 extends over the bare metal lower base portion 238.

Referring to FIGS. 15 and 16, side views of the altered embodiment locking device are shown. Handle 230, with elastomeric coating 268 and weldment 278 extends from the bottom of the external housing 228. Shown at one side is the base 237 and base 239 associated with arms 232 and 234, respectively. Base 237, is formed four corner slots, 221, 223, 225, and 227, for facilitating weldment of the outer housing 228 to a base, the end of the outer housing 228, having four corresponding weld extensions or tabs.

Referring to FIGS. 15–16, the opposite base 239 has four corresponding slots 229, 231, 233, and 235, for facilitating welding the inner housing 256 thereto. The internal, serrated locking bracket is attached to the base 237 with, preferably, conventional welding techniques, and at the slots 241 and 243. The bracket has two corresponding weld extensions which are inserted through the slots 241, 243 and are welded thereto. The extensions correspond to the weld extensions 128 and 130 shown in FIG. 5, as described with respect to locking bracket 66 of the first preferred embodiment. Referring to FIG. 16, the external portion of the cylinder 240 is shown extending through a correspondingly sized and positioned bore in the base 239.

It will be understood that certain features and sub-combinations are of utility and may be employed without reference to other features and sub-combinations as they are outlined within the description above and within the claims appended hereto. While the preferred embodiments and application of the invention have been described, it is apparent to those skilled in the art that the objects and features of the present invention are only limited as set forth in the claims appended hereto.

I claim:

1. A vehicle wheel lock comprising:

a first member having an open end, a closed end, a length, a width, and a height defining an inner periphery having a predetermined size and shape;

a second member having an open end, a closed end, a length, a width and a height defining an outer periphery;

said first member at least partially inserted into said second member;

a first arm positioned at the closed end of said first member, said first arm including a first arm portion extending a predetermined distance from said first member in a direction generally perpendicular to its length and a second arm portion positioned at the distal end of the first arm portion and extending a predetermined distance at an angle less than perpendicular to the length of the first member;

a second arm positioned at the closed end of said second member, said second arm including a first arm portion extending a predetermined distance from said second member in a direction generally perpendicular to its length and a second arm portion positioned at the distal end of the first arm portion and extending a predetermined distance at an angle less than perpendicular to the length of the second member;

a locking mechanism having a cylinder portion, a cam lock, an end cap, a keeper and a locking bracket portion;

the cylinder portion being positioned within one of said members and along its longitudinal centerline; and the bracket portion being positioned within the other of said members and extending through a slot in said end cap and through a slot in said keeper.

2. The lock of claim 1 further including a handle positioned on said second member.

3. The lock of claim 1 further including an elastomeric coating over at least a portion of said first arm and over at least a portion of said second arm.

4. The lock of claim 1 wherein said cam lock is operatively connected to a cylinder and has two portions, each portion adapted to engage with said bracket.

5. The lock of claim 4 wherein said locking bracket portion includes a u-shaped bracket having a plurality of serrations adapted for cooperating with said cam lock to lock and unlock said locking mechanism.

6. The lock of claim 4 wherein said cylinder portion further includes:
a cylinder extension operatively connected to said cylinder at one end and to a shaft at a second end;
said shaft operatively connected to said cam lock.

7. A vehicle wheel lock comprising:
a first member having an open end, a closed end, a length, a width, and a height defining an inner periphery having a predetermined size and shape;
a second member having an open end, a closed end, a length, a width and a height defining an outer periphery;
said first member at least partially inserted into said second member;
a first arm positioned at the closed end of said first member, said first arm including a first arm portion extending a predetermined distance from said first member in a direction generally perpendicular to its length and a second arm portion positioned at the distal end of the first arm portion and extending a predetermined distance at an angle less than perpendicular to the length of the first member;
a second arm positioned at the closed end of said second member, said second arm including a first arm portion extending a predetermined distance from said second member in a direction generally perpendicular to its length and a second arm portion positioned at the distal end of the first arm portion and extending a predetermined distance at an angle less than perpendicular to the length of the second member;
a locking mechanism having a cylinder portion and a locking bracket portion, the cylinder portion being positioned within one of said members and the bracket portion being positioned within the other of said members;
said locking mechanism cylinder portion includes a cylinder and a cam lock operatively connected to said cylinder;
a cylinder extension operatively connected to said cylinder at one end and to a shaft at a second end;
said shaft operatively connected to said cam lock;
a u-shaped keeper positioned inside of said second tubular member and having a bottom wall, a first side wall and a second side wall;
the first side wall attached to one wall of the second tubular member and the second side wall attached to the opposite wall of the second member; and
the bottom wall having a bore adapted to accommodate said shaft, and slots adapted to accommodate a bracket having a plurality of serrations.

8. The lock of claim 1 further including a plurality of raised portions positioned on the outer periphery of said first member.

9. In a u-shaped vehicle wheel lock having a first arm and a second arm for clasping opposite sides of the wheel of a vehicle and a first base connected to the first arm and a second base connected to the second arm, the improvement comprising:
a locking mechanism positioned internal to the first base and to the second base;
the locking mechanism including a cylinder connected to the first base, a cam lock operatively connected to the cylinder and a serrated bracket connected to the second base; and
the serrated bracket having a U shape, with the open end of the U facing toward the first base, and the closed end of the U fastened to the second base.

10. The lock of claim 9 further including a handle attached to either of said first base or said second base and extending in a direction generally opposite the direction from which the first arm and the second arm extend from the first base and from the second base.

11. The lock of claim 9 wherein said first base is insertable into said second base.

12. The lock of claim 9 further including an elastomeric coating over at least part of said first arm and an elastomeric coating over at least a part of said second arm.

13. The lock of claim 9 wherein:
the first arm includes a base and two legs extending from the base and joining at a first apex to form a first triangle, with the base of the first triangle formed at the lock base, the two legs of the first triangle extending outward from the lock base to said first apex; and
the second arm includes a base and two legs extending from the base and joining at a second apex to form a second triangle, with the base of the second triangle formed at the lock base, the two arms of the second triangle extending outward from the lock base to said second apex.

14. The lock of claim 13 further including an embossment positioned at the first triangle and at the second triangle.

15. The lock of claim 10 wherein an elastomeric coating covers at least part of said handle.

16. A vehicle wheel lock comprising:
a first member having an open end, a closed end, a length, a width, and a height defining an inner periphery having a predetermined size and shape;
a second member having an open end, a closed end, a length, a width and a height defining an outer periphery;
said first member at least partially inserted into said second member;
a first arm positioned at the closed end of said first member, said first arm including a first arm portion extending a a predetermined distance from said first member in a direction generally perpendicular to its length and a second arm portion positioned at the distal end of the first arm portion and extending predetermined distance at an angle less than perpendicular to the length of the first member;
a second arm positioned at the closed end of said second member, said second arm including a first arm portion extending a predetermined distance from said second member in a direction generally perpendicular to its length and a second arm portion positioned at the distal end of the first arm portion and extending a predetermined distance at an angle less than perpendicular to the length of the second member;

a locking mechanism having a cylinder portion and a locking bracket portion, the cylinder portion being positioned within one of said members and the bracket portion being positioned within the other of said members;

a u-shaped retaining bar having a rectangular base, a first leg and a second leg extending orthogonal to the bar to form a u-shape; and a first bore at the distal end of the first leg and a second bore at the distal end of the second leg whereby the retaining bar is adapted to be placed on said arm portions by insertion of said arm portions through said first bore and through said second bore.

17. The lock of claim 9 wherein the first base and the second base are rectangular in cross section.

18. The lock of claim 9 wherein said locking mechanism further includes a u-shaped end piece connected to the first base and provided with slots adapted to permit passage of said bracket therethrough.

19. The lock of claim 9 wherein said locking mechanism further includes a u-shaped keeper having a bore positioned in the center of the base of the u, longitudinal slots positioned in the base of the u at the longitudinal ends thereof and adapted to permit passage of said bracket therethrough.

20. The lock of claim 9 wherein said cam lock includes a rectangular member having rounded ends and adapted to be insertable into opposing legs of said serrated bracket.

* * * * *